United States Patent [19]

Itoh

[11] Patent Number: 4,941,036
[45] Date of Patent: Jul. 10, 1990

[54] COMMAND SENSOR IN PROJECTION DISPLAY APPARATUS

[75] Inventor: Masateru Itoh, Nagaokakyo, Japan

[73] Assignee: Mitsubishi Denki Kabushiki Kaisha, Tokyo, Japan

[21] Appl. No.: 267,563

[22] Filed: Nov. 7, 1988

[30] Foreign Application Priority Data

Nov. 12, 1987 [JP] Japan ................... 62-287978

[51] Int. Cl.$^5$ .................. H04N 5/74; H04N 9/31
[52] U.S. Cl. ..................... 358/60; 358/231; 358/194.1; 455/603
[58] Field of Search .............. 358/60, 231, 194.1; 340/825.69, 825.72; 341/176; 455/603

[56] References Cited

U.S. PATENT DOCUMENTS

| | | | |
|---|---|---|---|
| 4,337,480 | 6/1982 | Bourassin et al. | 455/603 |
| 4,400,723 | 8/1983 | Fanizza et al. | 358/60 |
| 4,509,211 | 4/1985 | Robbins | 455/603 |
| 4,841,368 | 6/1989 | Rumbolt et al. | 455/603 |

FOREIGN PATENT DOCUMENTS

| | | | |
|---|---|---|---|
| 0102980 | 8/1980 | Japan | 358/60 |
| 0181281 | 11/1982 | Japan | 355/194.1 |
| 62-8761 | 1/1987 | Japan . | |

*Primary Examiner*—Howard W. Britton
*Assistant Examiner*—Kim Yen Vu

[57] ABSTRACT

A back-projection picture display apparatus which consists of a cabinet including a back-projection screen with a Fresnel lens plate, a video projector unit housed within the cabinet, and a remote control system including a remote controller for generating an infrared beam of a particular characteristic descriptive of a particular command with which the apparatus is operated and a command sensor operable in response to the infrared beam to operate the apparatus to accomplish a mode of operation assigned by such particular command. The command sensor is housed within the cabinet and arranged at a location where the infrared rays of light passing through the Fresnel lens plate are converged.

10 Claims, 1 Drawing Sheet

COMMAND SENSOR IN PROJECTION DISPLAY APPARATUS

BACKGROUND OF THE INVENTION

1. Field of the Invention

The present invention generally relates to a projection picture display apparatus such as, for example, a projection-type television receiver set and, more particularly, to a remote control system used in the projection picture display apparatus. Still more particularly, the present invention relates to the arrangement of an optical command sensor of the remote control system in the projection picture display apparatus.

2. Description of the Prior Art

Television receiver sets now available in the commercial market, including those of projection type, have a remote control system comprising a hand-held remote controller, or optical command emitter, for generating an infrared beam of a particular characteristic descriptive of a particular command such as, for example, a channel selection command, an audio sound adjusting command or a power on-off command, and a command sensor or receiver operable in response to the infrared beam to operate a circuit component assigned to accomplish such particular command. One example of the prior art back-projection television receiver sets is illustrated in FIGS. 1(a) and 1(b) in schematic front elevational and side sectional representations, respectively.

As shown in FIGS. 1(a) and 1(b), the back-projection television receiver set comprises a cabinet C having top and bottom walls, front and rear walls and a pair of opposite side walls all assembled to render the cabinet C to represent a generally rectangular box-like configuration. The cabinet C has upper and lower compartments defined therein. A video projector unit P is housed within the lower compartment of the cabinet C and comprises three cathode ray tube units each including a red, green or blue color cathode ray tube 1 and a projector lens assembly 2, said video projector unit P being so supported and so positioned that a picture reproduced by the cathode ray tube 1 can be projected by the projector lens assembly 2 towards a back-projection screen 4, supported in the front wall of the cabinet C, after having been reflected by a reflector mirror 3 supported in the rear wall of the cabinet C. The projector lens assembly 2 serves not only to relay the television picture to a remote place, that is, onto the back-projection screen 4, but also to enlarge the picture being projected onto the back-projection screen 4. The front wall of the cabinet C has at a location immediately below the back-projection screen 4 a utility panel where various adjustment knobs are installed for the access of a viewer thereto. The utility panel includes a sensor window defined in alignment with the infrared command sensor 5 for receiving the infrared command therethrough.

Since, as hereinabove discussed, the command sensor in the prior art television receiver set of back-projection type is installed in the utility panel immediately beneath the back-projection screen so that the infrared command emitted from the hand-held remote controller (not shown) can be received through the sensor window, it often occurs that a major portion of the infrared rays of light representing the infrared command emitted from the remote controller will not be effectively received by the command sensor, thereby posing a problem associated with the directionality and the distance of reach of the infrared command.

In other words, since the infrared rays of light emitted from the remote controller are scattered even though the remote controller is carefully aimed at the command sensor spaced a substantial distance from the remote controller, the intensity of the infrared rays of light received by the command sensor is appreciably reduced. Moreover, the coverage of the command sensor, within which the command sensor can respond to the infrared command, is relatively narrow. Because of these reasons, aiming the remote controller at the command sensor as accurately as possible is not easy, and this is particularly true where a substantial distance between the remote controller and the command sensor is realized. These problems are not uncommon in a back-projection television receiver set having a relatively large screen.

In addition, the provision of the sensor window at the utility panel immediately beneath the back-projection screen brings about a problem associated with the aesthetic layout of the cabinet.

The Japanese Laid-open Utility Model Publication No. 62-8761, published January 20, 1987, discloses a back-projection television receiver set wherein first and second reflector mirrors are disposed between the video projector unit and the back-projection screen, the first reflector mirror being housed within the lower compartment of the cabinet and the second reflector mirror within the upper compartment of the cabinet in opposition to the back-projection screen. The command sensor is installed, in one embodiment, within the upper compartment and immediately below the second reflector mirror so that the infrared beam emitted from the external remote controller can be received after having passed through the back-projection screen. In another embodiment of the Japanese publication referred to above, the command sensor is installed within the lower compartment immediately above the video projector unit so that the infrared beams emitted from the external remote controller can be received after having passed through the back-projection screen and then reflected by the second reflector mirror.

In any event, although the Japanese publication referred to above discloses the command sensor installed completely within the cabinet with no sensor window defined at the utility panel, this is solely for substantially eliminating the problem associated with the aesthetic layout of the cabinet as a whole. No special consideration has been paid whatsoever in connection with the position of the command sensor in relation to both of the nature of the back-projection screen and the infrared rays of light emitted from the remote controller and, therefore, the Japanese publication explicitly suggests the positioning of the command sensor at any suitable location within the cabinet if and only if the command sensor so positioned can receive the infrared command either directly or reflected from one or both of the reflector mirrors. Accordingly, the remote control system disclosed in the Japanese publication referred to above has a problem associated with the directionality of the remote controller.

SUMMARY OF THE INVENTION

The present invention has been devised with an aim at minimizing or substantially eliminating the above discussed problems inherent in the prior art remote control system and is intended to provide an improved remote control system for a back-projection picture display apparatus wherein the loss of the infrared rays of light emitted from the remote controller is advantageously minimized to permit the command sensor to receive a major portion thereof.

A still further object of the present invention is to provide the improved remote control system of the type referred to above, effective to minimize the occurrence of an erroneous operation of the picture display apparatus, even though a substantial distance exists between the remote controller and the command sensor, without adversely affecting the aesthetic layout of the cabinet.

In order to accomplish these objects of the present invention, there is provided an improved back-projection picture display apparatus comprising a cabinet including a back-projection screen which consists of a Fresnel lens plate, a video projector unit housed within the cabinet, and a remote control system including a remote controller for generating an infrared beam of a particular characteristic descriptive of a particular command with which the apparatus is operated and a command sensor operable in response to the infrared beam to operate the apparatus to accomplish a mode of operation assigned by such particular command. The command sensor is housed within the cabinet and arranged at a location where external rays of light passing through the Fresnel lens plate are converged.

In accordance with the present invention, since the command sensor is so positioned within the cabinet as to have its light receiving area coincide or substantially coincide with the point where the infrared rays of light representing the infrared command emitted from the remote controller can converge after they have passed through the Fresnel lens plate forming the back-projection screen, a major portion of the infrared rays of light emitted from the remote controller can be received by the command sensor.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and wherein:

DETAILED DESCRIPTION OF THE EMBODIMENT

In describing a preferred embodiment of the present invention, reference will be made to the back-projection television receiver set, although the present invention is equally applicable to any other back-projection picture display apparatus such as, for example, a slide projector of console model utilizing a back-projection screen.

Figure 1A:
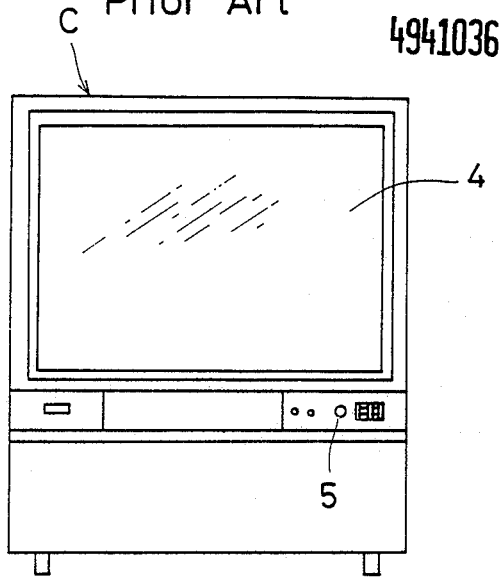
FIG. 1(a) is a schematic front elevational view of a prior art back-projection television receiver set.
Figure 1B:
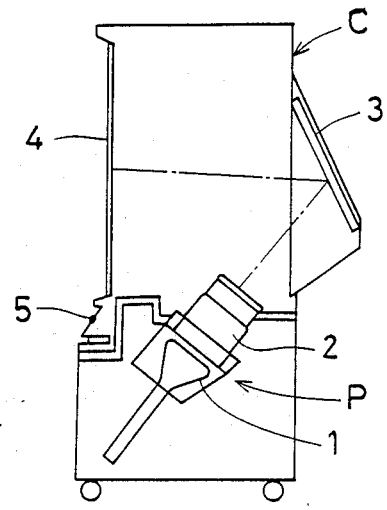
FIG. 1(b) is a schematic side sectional view of a prior art television receiver set shown in FIG. 1.
Figure 2:
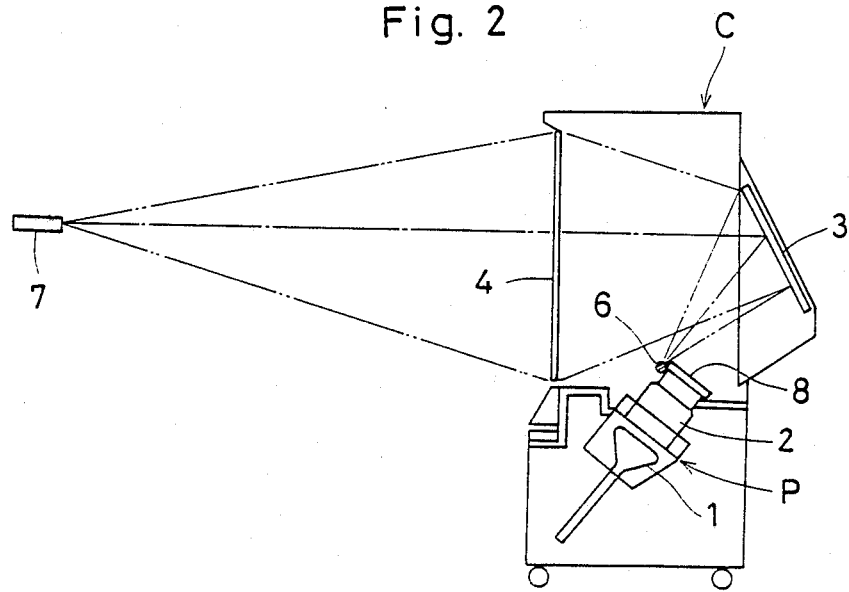
FIG. 2 is a schematic side sectional view of a back-projection television receiver set embodying the present invention.

Referring now to FIG. 2, as is the case with the prior art back-projection television receiver set shown in and described with reference to FIGS. 1(a) and 1(b), the back-projection television receiver set shown therein comprises a cabinet C having top and bottom walls, front and rear walls and a pair of opposite side walls all assembled to render the cabinet C to represent a generally rectangular box-like configuration having upper and lower compartments defined therein. A video projector unit P is housed within the lower compartment of the cabinet C and comprises three cathode ray tube units, each of said cathode ray tube unit including a red, blue or green color cathode ray tube 1 and a projector lens assembly 2. The three cathode ray tube units forming the video projector unit P are arranged within the cabinet C in a row extending widthwise of the cabinet C, or the back-projection screen, with respective picture projecting faces 8 laying in a common plane and are so supported and so positioned that red, green and blue pictures reproduced by the red, green and blue color cathode ray tubes 1 can be projected by the respective projector lens assemblies 2 onto a reflector mirror 3, which is supported in the rear wall of the cabinet C, and then reflected by the reflector mirror 3 towards the back-projection screen 4 whereat the pictures of three primary colors are matched together to provide a color video picture. The color video picture so projected onto the back-projection screen 4 can be viewed from the front of the cabinet generally in a direction counter to the direction of travel of the imagewise rays of light reflected from the reflector mirror 3.

The projector lens assembly 2 serves not only to relay the television picture as a whole to a remote place, that is, onto the back-projection screen 4, but also to enlarge the picture being projected onto the back-projection screen 4.

The back-projection screen 4 used in the practice of the present invention is of a type comprising either a single-layered structure or a double- or multi-layered structure including a Fresnel lens plate and a diffusing or lenticular lens plate. In the single-layered structure, the Fresnel lens plate and the diffusing or lenticular lens plate are formed on respective opposite surfaces of a single substrate. In the multi-layered structure, at least the Fresnel lens plate and the diffusing or lenticular lens plate separate from the Fresnel lens plate are sandwiched or integrated together. In either case, therefore, the back-projection screen 4 can exhibit an effect or characteristic similar to an optical lens element.

The back-projection screen 4 and the video projector unit P are so positioned relative to each other that one of the focal points of the Fresnel lens plate situated within the cabinet C can be occupied by the center of the front of one of the cathode ray tube units which is located intermediate the row of the cathode ray tube units, i.e., the green color cathode ray tube unit.

The remote controller in the form of a hand-held remote controller is identified by 2 and the command sensor is identified by 6. The command sensor 6 is mounted on the projector lens assembly 2 of the green color cathode ray tube unit with its light receiving area directed towards the reflector mirror 3, that is, oriented in a direction conforming to the direction of emission of the green color picture from the green color cathode ray tube unit. The command sensor 6 so mounted is positioned at a location where infrared rays of light emitted from the remote controller 7, distant from the television receiver set, and entering the cabinet C through the back-projection screen 4 can, after having been reflected by the reflector mirror 3, be converged.

In other words, the command sensor 6 according to the present invention is disposed in the vicinity of the focal point of the Fresnel lens plate forming the back-projection screen 4.

As a matter of course, the remote controller 7 is located distant exteriorly from the television receiver set and also distant from the other of the focal points of the Fresnel lens plate forming the back-projection screen 4 which is situated outside the cabinet C. Accordingly, it is usual that the infrared rays of light emitted from the remote controller 7 towards the back-projection screen 4 are flooded over the back-projection screen 4. However, the infrared rays of light so flooded over the back-projection screen 4 are collected by the Fresnel lens plate forming the back-projection screen 4 as they pass therethrough and are, after having been reflected by the reflector mirror 3, converged so as to be received by the command sensor 6.

Thus, according to the present invention, the infrared rays of light flooded over the back-projection screen 4 are so collected as to be converged at the focal point of the Fresnel lens plate forming the back-projection screen 4 which is situated within the cabinet C and, therefore, the command sensor 6 positioned in the vicinity of such focal point of the Fresnel lens plate can receive a major portion of the infrared rays of light emitted from the remote controller 7. The consequence is that, even though the remote controller 7 is located a substantial distance away from the television receiver set, an associated circuit component, for example, a power supply switch or a channel selector, of the television receiver set can be effectively and satisfactorily controlled.

As can be understood from the foregoing description of the preferred embodiment of the present invention, the relatively large back-projection screen 4 itself serves as a sensor window and, therefore, as compared with the sensor window of limited surface area such as used in the prior art remote control systems, a relatively large amount of the infrared rays of light emitted from the remote controller 7 are permitted for reception by the command sensor 6. Therefore, as compared with the prior art remote control systems, the present invention substantially alleviates the necessity of the remote controller to be carefully aimed at the sensor window, thereby enhancing the operativity of the remote control system.

Although the present invention has fully been described in connection with the preferred embodiment thereof reference to the accompanying drawings used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. A back-projection picture display apparatus comprising:
    a back-projection screen including a Fresnel lens plate;
    a video projector unit; and
    a remote control system including a remote controller for generating an infrared beam of a particular characteristic descriptive of a particular command with which the apparatus is operated and a command sensor operable in response to the infrared beam to operate the apparatus to accomplish a mode of operation assigned by such particular command, said command sensor being arranged at a location where the infrared beams passing through the Fresnel lens plate are converged.

2. A back-projection picture display apparatus comprising:
    a cabinet including a back-projection screen consisting of a Fresnel lens plate;
    a video projector unit housed within the cabinet; and
    a remote control system including a remote controller for generating an infrared beam of a particular characteristic descriptive of a particular command with which the apparatus is operated and a command sensor operable in response to the infrared beam to operate the apparatus to accomplish a mode of operation assigned by such particular command, said command sensor being housed within the cabinet and arranged at a location where the infrared rays of light collected by and subsequently passing through the Fresnel lens plate are converged.

3. A back-projection picture display apparatus comprising:
    a cabinet including a back-projection screen consisting of a Fresnel lens plate;
    a video projector means housed within the cabinet and comprising red, green and blue color cathode ray tube units each having a picture projecting face for projecting red, green and blue pictures, respectively, onto the back-projection screen, said cathode ray tube units being arranged in a row with the respective picture projecting faces lying in a common plane; and
    a remote control system including a remote controller for generating an infrared beam of a particular characteristic descriptive of a particular command with which the apparatus is operated and a command sensor operable in response to the infrared beam to operate the apparatus to accomplish a mode of operation assigned by such particular command, said command sensor being housed within the cabinet and mouted on an intermediate one of said cathode ray tube units arranged in a row, for reception of the infrared beams emitted from the remote controller and passing through the Fresnel lens plate.

4. The back-projection picture display apparatus as claimed in claim 3, wherein each of the red, green and blue color cathode ray tube units comprises a cathode ray tube and a projector lens assembly for enlarging the picture reproduced by said respective cathode ray tube.

5. The back-projection picture display apparatus as claimed in claim 4, wherein the picture projecting face of said one of the cathode ray tube units is positioned substantially at one of the focal points of the Fresnel lens plate.

6. The back-projection picture display apparatus as claimed in claim 4, wherein the cabinet also includes a reflector mirror supported in opposition to the back-projection screen and wherein said video projector means is so positioned as to direct the pictures of three primary colors toward the reflector mirror and then toward the back-projection screen.

7. The back-projection picture display apparatus as claimed in claim 4, wherein the cabinet also includes a reflector mirror supported in opposition to the back-projection screen and wherein said video projector means is so positioned as to direct the pictures of three primary colors toward the reflector mirror and then toward the back-projection screen, said command sensor being adapted to receive the infrared beams emitted from the remote controller which have been passed through the back-projection screen and then reflected by the reflector mirror.

8. A back-projection picture display apparatus comprising:
   a cabinet including a back-projection screen consisting of a Fresnel lens plate;
   a video projector means housed within the cabinet and comprising red, green and blue color cathode ray tube units each having a picture projecting face for projecting red, green and blue pictures, respectively, onto the back-projection screen, said cathode ray tube units being arranged in a row with the respective picture projecting faces lying in a common plane; and
   a remote control system including a remote controller for generating an infrared beam of a particular characteristic descriptive of a particular command with which the apparatus is operated and a command sensor operable in response to the infrared beam to operate the apparatus to accomplish a mode of operation assigned by such particular command, said command sensor being housed within the cabinet and disposed at a location in the vicinity of or generally coinciding with one of the focal points of the Fresnel lens plate, which is situated within the cabinet, for reception of the infrared beams emitted from the remote controller and passing through the Fresnel lens plate.

9. The back-projection picture display apparatus as claimed in claim 8, wherein each of the red, green and blue color cathode ray tube units comprises a cathode ray tube and a projector lens assembly for enlarging the picture reproduced by said respective cathode ray tube.

10. The back-projection picture display apparatus as claimed in claim 8, wherein the cabinet also includes a reflector mirror supported in opposition to the back-projection screen and wherein said video projector means is so positioned as to direct the pictures of three primary colors toward the reflector mirror and then toward the back-projection screen, said command sensor being adapted to receive the infrared beams emitted from the remote controller which have been passed through the back-projection screen and then reflected by the reflector mirror.

* * * * *